United States Patent [19]
Warren

[11] 3,866,111
[45] Feb. 11, 1975

[54] METHOD OF MINERAL EXPLORATION BY DETECTING ELECTROMAGNETIC ENERGY AT POWER LINE FREQUENCY

[75] Inventor: Roy K. Warren, Houston, Tex.

[73] Assignee: Exxon Production Research Company, Houston, Tex.

[22] Filed: July 18, 1973

[21] Appl. No.: 380,518

[52] U.S. Cl............................ 324/3, 324/6, 324/67
[51] Int. Cl. ........................ G01v 3/08, G01v 3/12
[58] Field of Search........................ 324/1, 3, 6–8, 324/67

[56] References Cited
UNITED STATES PATENTS

| | | | |
|---|---|---|---|
| 1,794,666 | 3/1931 | Bieler et al. ............................ | 324/6 |
| 2,192,404 | 3/1940 | Jakosky .................................. | 324/1 |
| 2,268,106 | 12/1941 | Blau...................................... | 324/6 |
| 2,501,598 | 3/1950 | Eltenton et al. ...................... | 324/67 |
| 2,559,586 | 7/1951 | Bjarnason ........................... | 324/8 X |
| 2,931,974 | 4/1960 | McLaughlin et al.................... | 324/8 |
| 3,087,111 | 4/1963 | Lehan et al......................... | 324/7 X |
| 3,500,175 | 3/1970 | Ronka................................ | 324/7 X |
| 3,548,299 | 12/1970 | Duroux et al........................... | 324/6 |

Primary Examiner—Gerard R. Strecker
Attorney, Agent, or Firm—John S. Schneider

[57] ABSTRACT

A method for exploring for subsurface electrically conductive bodies in which an existing electrical power transmission line is used as a source or transmitter of electromagnetic energy departed to the ground. The electromagnetic energy induced in the ground by the transmitted electromagnetic energy is measured at spaced apart, horizontally aligned stations in transverse, parallel and vertical directions relative to the line of stations and plotted against the station locations. The presence and location of a subsurface conductor body capable of producing measurable induced electromagnetic energy is determinable from resolution and shape of the plotted curves.

1 Claim, 10 Drawing Figures

METHOD OF MINERAL EXPLORATION BY DETECTING ELECTROMAGNETIC ENERGY AT POWER LINE FREQUENCY

BACKGROUND OF THE INVENTION

The present invention relates to improvements in geophysical prospecting and, in particular, it relates to a technique for exploring for subterranean mineral bodies having electrical conductor characteristics.

One known exploration method for locating subsurface conductor bodies measures the induced electromagnetic energy from a conductor body generated by the earth's magnetic field, which is utilized as a natural electromagnetic source or transmitter. The natural field energy impends on the conductor body from any and/or all directions. The orientation of the energy source relative to the station measurement location and the distance from the energy source thereto are unknown.

Other known exploration methods for locating subsurface conductor bodies measure the induced electromagnetic energy from the ground (and conductor bodies located therein) generated by a surface man-made electromagnetic transmitter. The transmitter is designed for the specific purpose of exploration. It is moved to and operated in the areas of the earth's surface which are to be investigated for the presence of subsurface conductor bodies. In these methods the location of the source and its orientation relative to the station measuring points and its distance therefrom are known.

The improvement of the present invention relates more to the latter methods which utilize the man-made electromagnetic energy. However, the transmitter is a permanently installed existing electrical power line. As with the methods in which the transmitter is made and used for the sole purpose of exploration, in the method of the invention the location of the energy source and its orientation and its distance from the measurement locations are all known. Such information is used in the interpretation of the measured data to determine the location of a subsurface conductor body. The geologic locality of the power line can affect the amount of energy available to the conductor body. The orientation of the power line relative to the conductor body affects the shape of the plotted profiles of the measured energy. The distance between the conductor body and the energy source affects the amplitude and shape of such profiles.

SUMMARY OF THE INVENTION

Briefly, the present invention involves a method for exploring for subterranean electrically conductive bodies in which an electrical power transmission line is used as a source of electromagnetic energy. A detector is tuned to the frequency, or a harmonic thereof, of the current of the transmission line. The electromagnetic energy induced in the ground by the source energy is measured at spaced apart aligned stations for selected spatial coordinate directions. These measurements are plotted against the station locations to provide indications of the presence and size of a subterranean conductor body.

DESCRIPTION OF THE PREFERRED EMBODIMENTS

Figure 1:
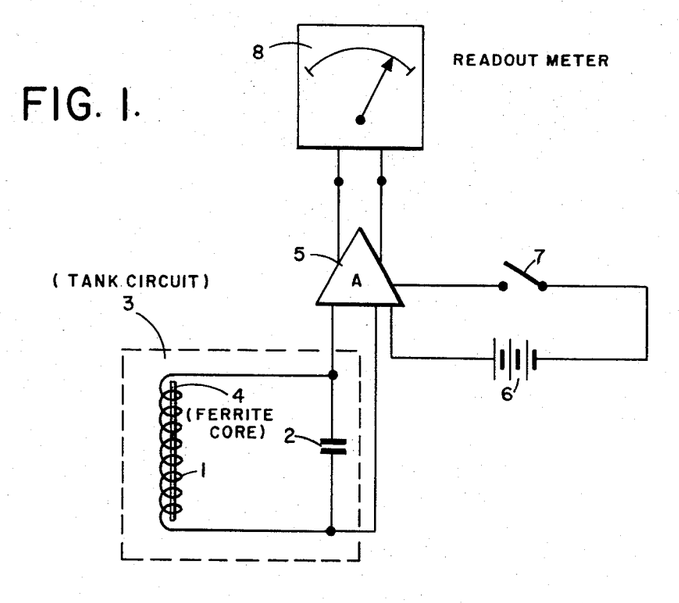
FIG. 1 is a schematic illustration of the instrumentation used to measure electromagnetic energy.

The instrumentation for measuring the induced electromagnetic field or energy is shown in FIG. 1. Such instrumentation includes a coil 1, having a ferrite core 4 to improve sensitivity, and a capacitor 2 forming a tank circuit 3 tuned to a resonant frequency of electrical power transmission lines either 50 Hz (Hertz-cycles per second) or 60 Hz or a harmonic of 50 or 60 Hz. The output of the tuned circuit 3 is fed to an amplifier 5 which is driven by a battery 6 and switch 7 circuit. The output of the amplifier is registered on a readout meter 8 in millivolt (mv) units. The sensitivity of the instrumentation is 1.0 millivolts.

Figure 2:
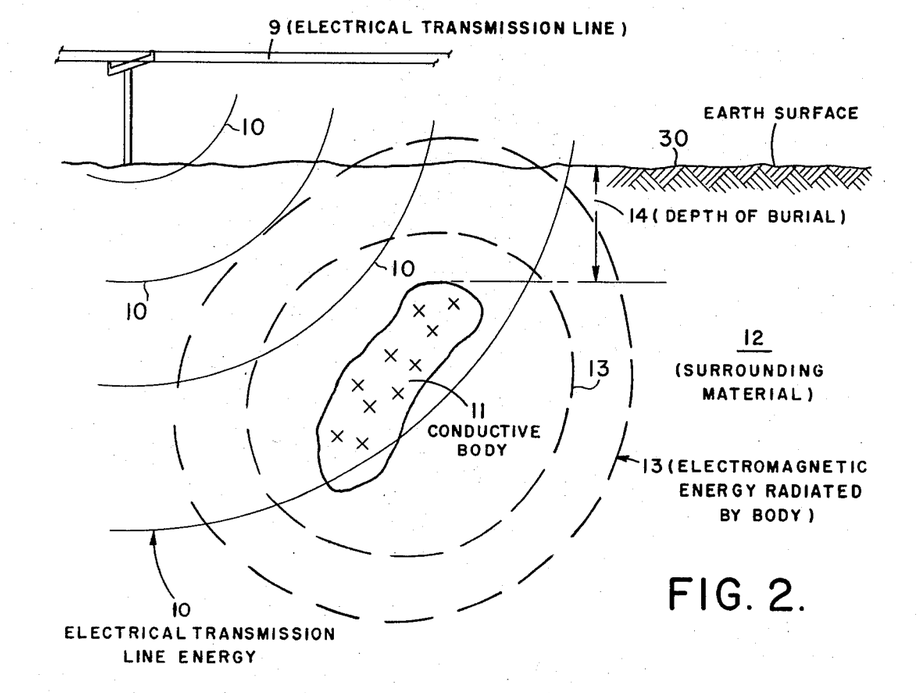
FIG. 2 is a profile view of the earth's surface and subsurface to illustrate the manner in which the invention operates.

The instrumentation of FIG. 1 is used for remote detection of a subsurface conductive body as illustrated in FIG. 2. An electrical transmission line 9 departs electromagnetic energy, indicated by the solid curved lines 10 to the ground, (the earth's surface being indicated at 30) by induction and ground leakage. Although shown as being positioned above ground transmission line 9 may be located underground or on the surface of the ground. The energy 10 causes current to flow in a subterranean conductive body 11 remotely located from transmission line 9. The distance between body 11 and transmission line 9 is dependent upon many variables involving the conductance of surrounding ground material 12. The current in body 11 radiates electromagnetic energy, indicated by the dashed lines 13, at the same frequency as the current flowing in electrical transmission line 9. Measurement of the electromagnetic energy 13 by the instrumentation of FIG. 1 at various station locations is used to determine the location and estimate the depth 14 of conductive body 11.

Data analysis is accomplished by plotting the measured values in profile and plan views. The plan view gives a strike direction and an indication of geologic structure.

Figure 3:
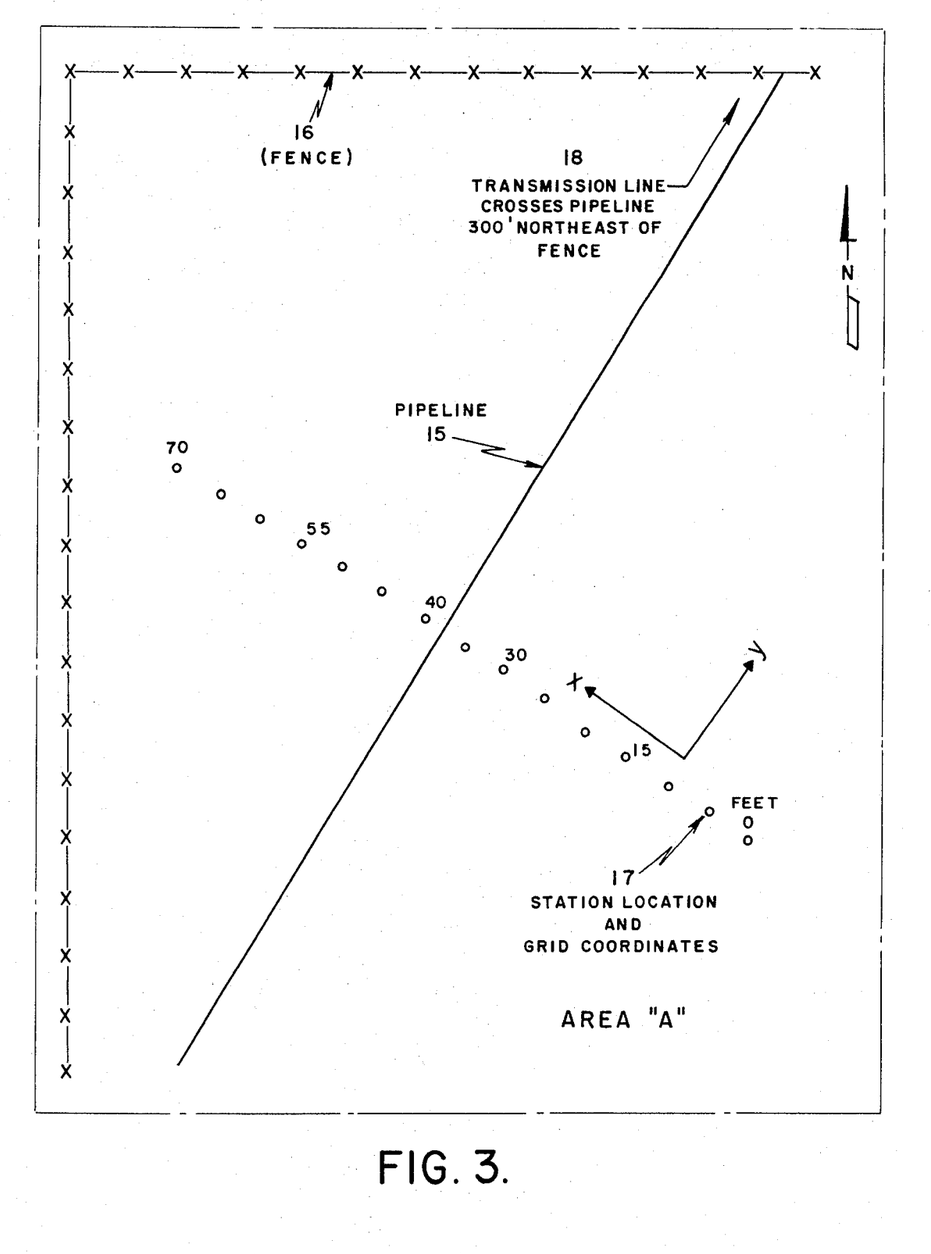
FIG. 3 is a plan view sketch of one area in which test surveys were conducted to determine location of a submerged pipeline.

In FIG. 3 an area A in which tests of the method were made is illustrated. The pipeline 15, which was used to simulate a subterranean mineral conductor body, was buried 6 to 8 feet and had a diameter of 6 to 8 inches. Area A also included a fence 16, various station locations with grid coordinates 17 and the nearest transmission line 18 (indicated by the arrowed line) which is located 300 feet north east of fence 16 and perpendicular to pipeline 15. The station locations 17 are spaced 5 feet apart (0 to 70 feet). Three readings were taken at each station location to obtain the transverse X, parallel Y and vertical Z grid coordinate measurements (relative to the pipeline or conductor body).

Figure 4:
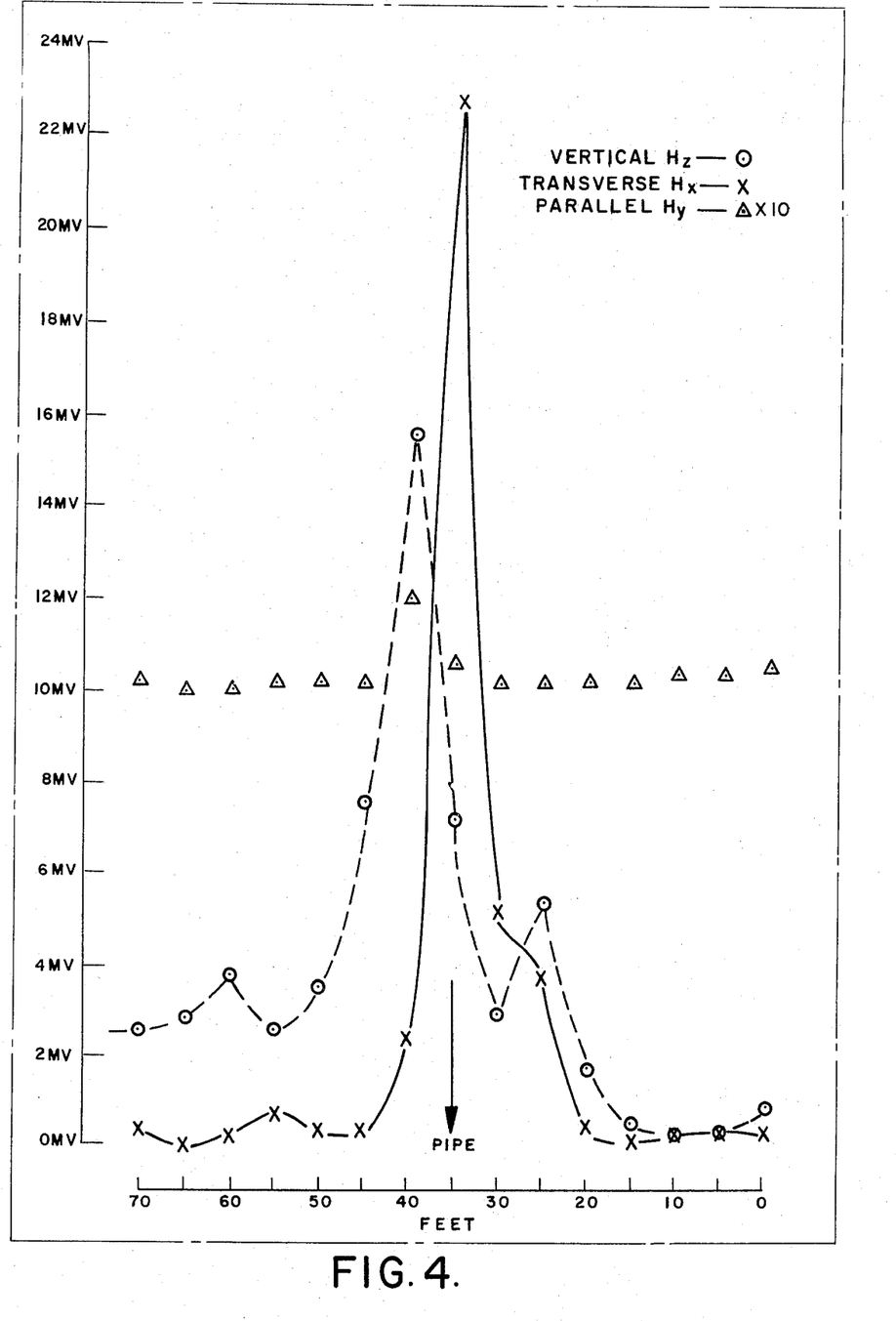
FIG. 4 is a plot showing the results of one of the test surveys conducted in the area shown in FIG. 3.

The results of the test in area A are shown in FIG. 4 where the X, Y and Z direction measurements are plotted in millivolts against the station locations (the Y measurements are multiplied by ten). The X-coordinate curve peaks at about 35 feet; the Y-coordinate curve at about 39 feet; and the Z-coordinate curve shows substantially no change (a slight increase is indicated at about 40 feet). The plotted profiles show the location of the pipeline and its orientation relative to the X, Y and Z coordinate system. If, as shown, the conductor body (pipeline) is perpendicular to the line of measurement stations, the X direction will give the largest amplitude, the Z direction less amplitude and the Y direction almost zero amplitude. Thus, if the strike of the pipeline or conductor body is unknown, one would hold the instruments in the horizontal position and rotate to get a maximum reading to establish the transverse or X-direction.

Figure 5:
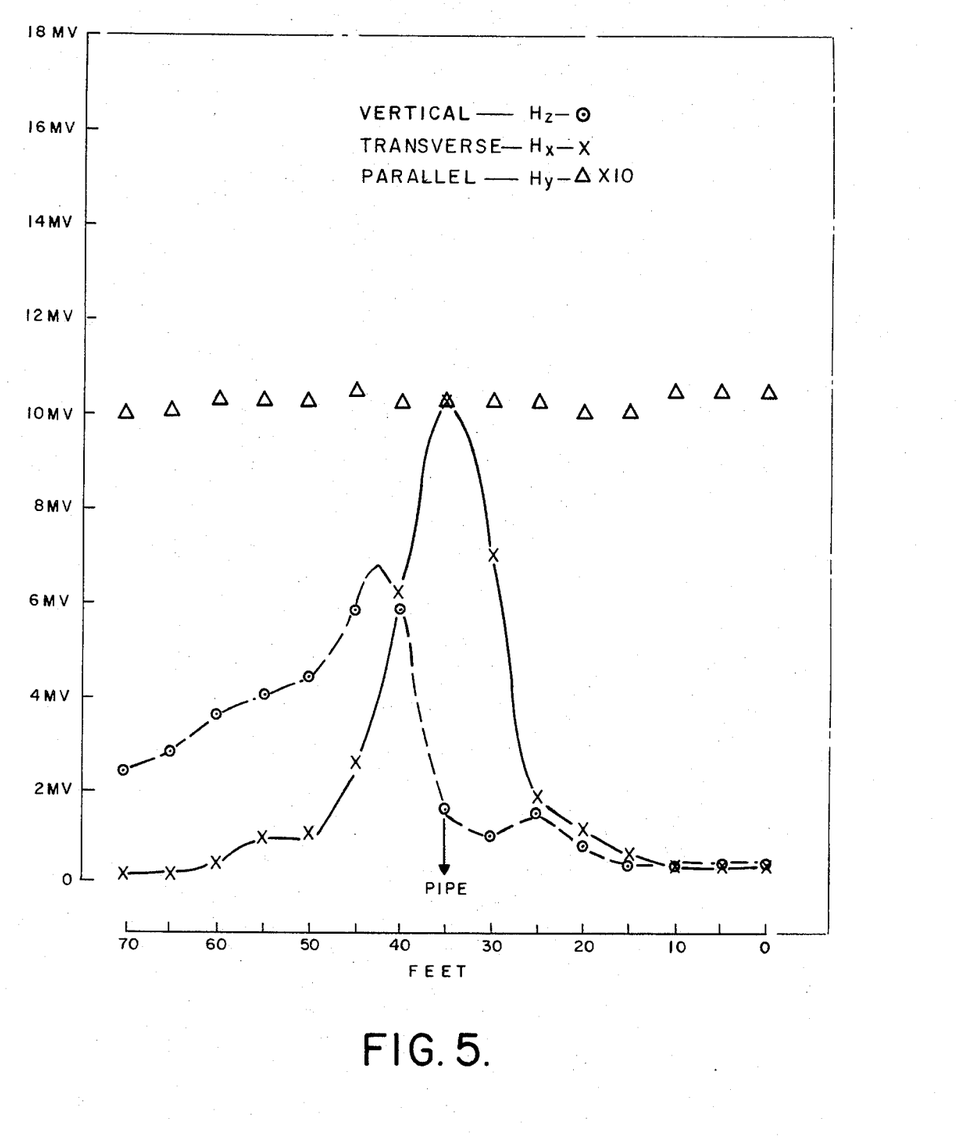
FIG. 5 is another plot showing a different test survey conducted in the area shown in FIG. 3.

The second test survey, plotted in FIG. 5 also shows the maximum type of response with the X-direction perpendicular to the strike. The survey of FIG. 5 was located 400 feet south-south-west along pipeline 15. At this location the pipeline is buried deeper than the portion of the pipeline shown in FIG. 4. The curves in FIG. 5 show a decrease in amplitude and changed shapes. The Y-plot shows no peaks. The X-plots and the Z-plots peak at substantially the same places in which each shows a maximum in FIG. 4, but the shape of the curves are broader with less amplitude. A decrease in amplitude and broader and smoother curves indicates a deeper conductor body.

Massive metallic sulfide bodies are good electrical conductors and can be detected by the instrumentation shown in FIG. 1 when sufficient transmission line energy is available.

Figure 6:
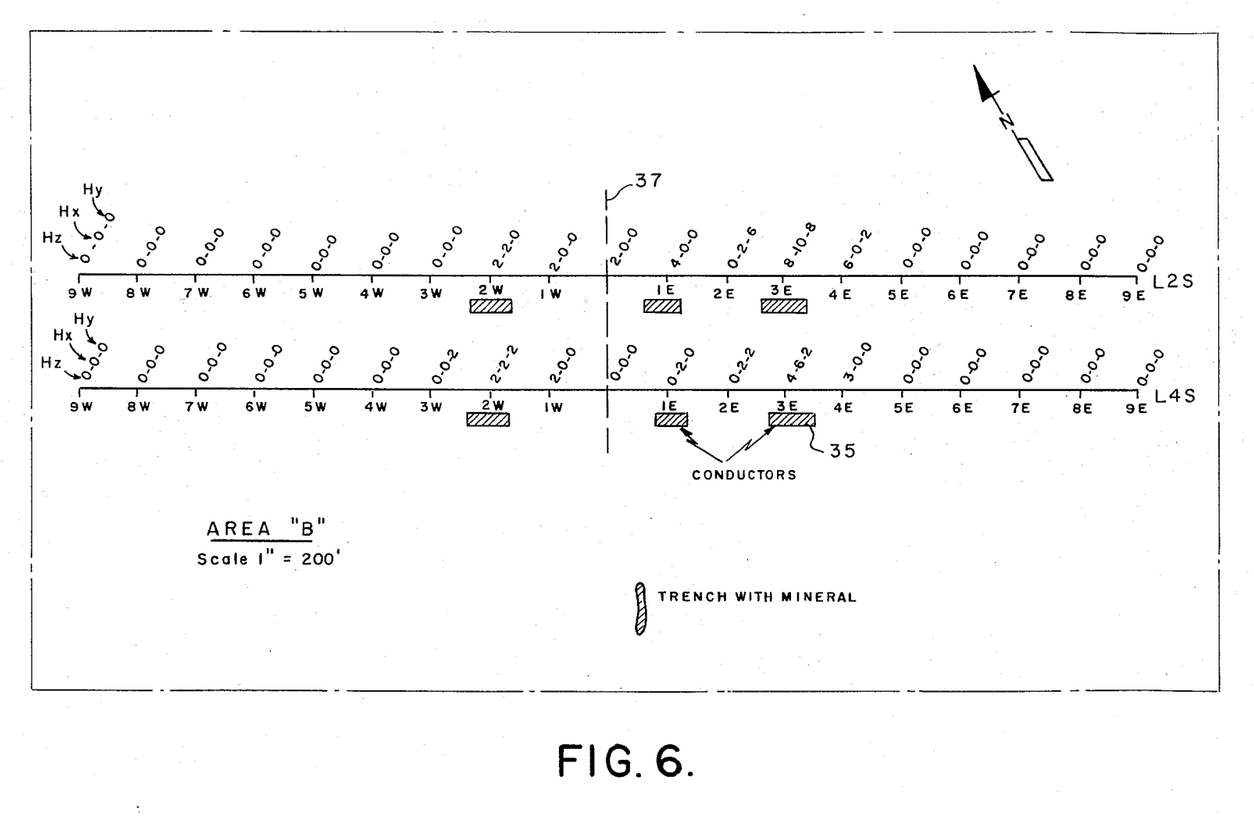
FIG. 6 shows a plan view sketch of another area in which test surveys were made to locate a subterranean massive sulfide body.
Figure 7:
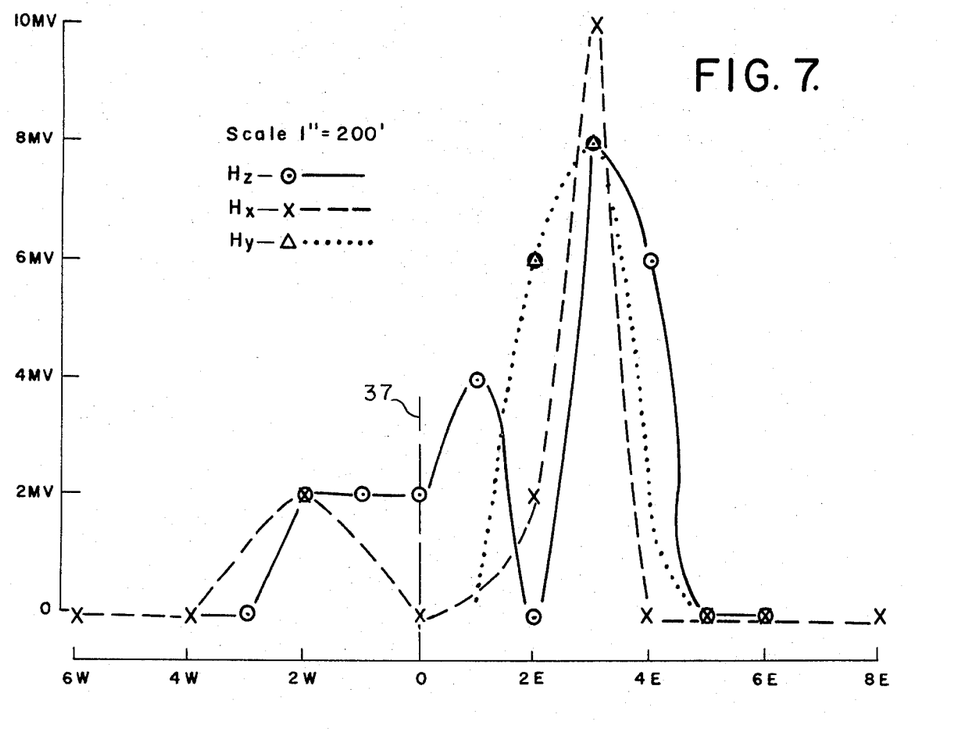
FIGS. 7 and 8 show data plotted in profile views for the area shown in FIG. 6.
Figure 8:
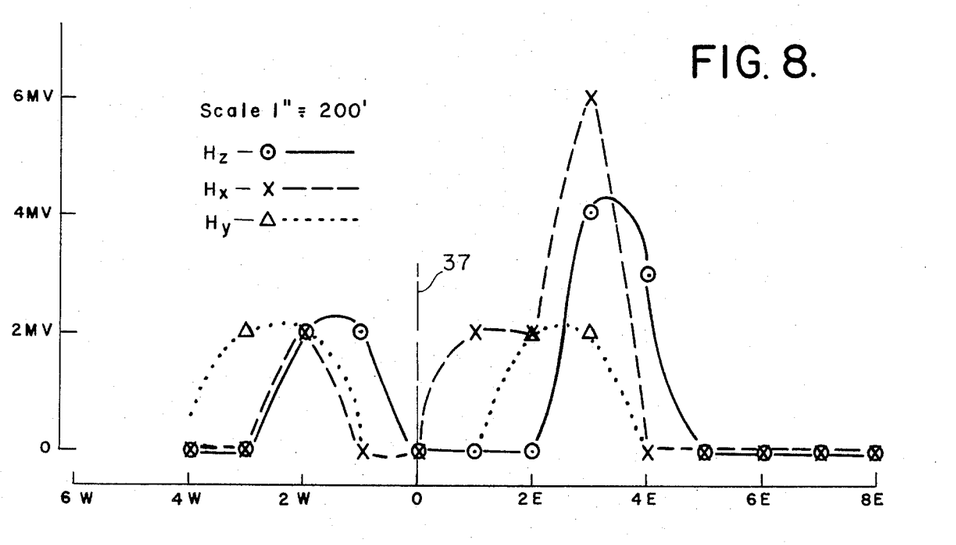

FIG. 6 is a plan view of a second area B in which tests were conducted. The data shown in FIGS. 7 and 8 are the results of test surveys L2S and L4S, respectively. These parallel surveys were made 200 feet apart and about 1 mile from the power transmission line. Parallel subterranean massive sulfide bodies are indicated at 3E, 1E and 2W. The one at 1E is possibly tied with the mineralized trench. The station locations are shown relative to a base line indicated at 37, and are spaced 100 feet apart. The location of the massive sulfide body at 1E was known prior to these surveys from previous drill data. The other massive sulfide bodies are predicted by the data at locations 2W and 3E, as indicated by the curves illustrated in FIGS. 7 and 8 and the other massive sulfide bodies at 2W and 3E were indicated by other types of standard geophysical techniques. The curves of these FIGS. show variations in the relative amplitudes of X, Y and Z and suggest geometric changes are possible between the three conductor bodies. For example, FIG. 7 at 3E shows that both the X and the Y measurements are of similar amplitude. A rotation of the instrument at that point in the horizontal plane to make X a maximum and Y a minimum would give an interpretation to the strike of the body. Similar interpretations would be made at points 2W and 1E. The surrounding material or host rock in these tests is extremely resistive and is not the type of geology that transmits electrical energy easily. A minimum amplitude level is shown. The responses measured were in the range of 2.0 mvs. to 10.0 mvs. More sensitivity than a 1.0 mv would result in more informative data when operating in this geologic environment.

Figure 9:
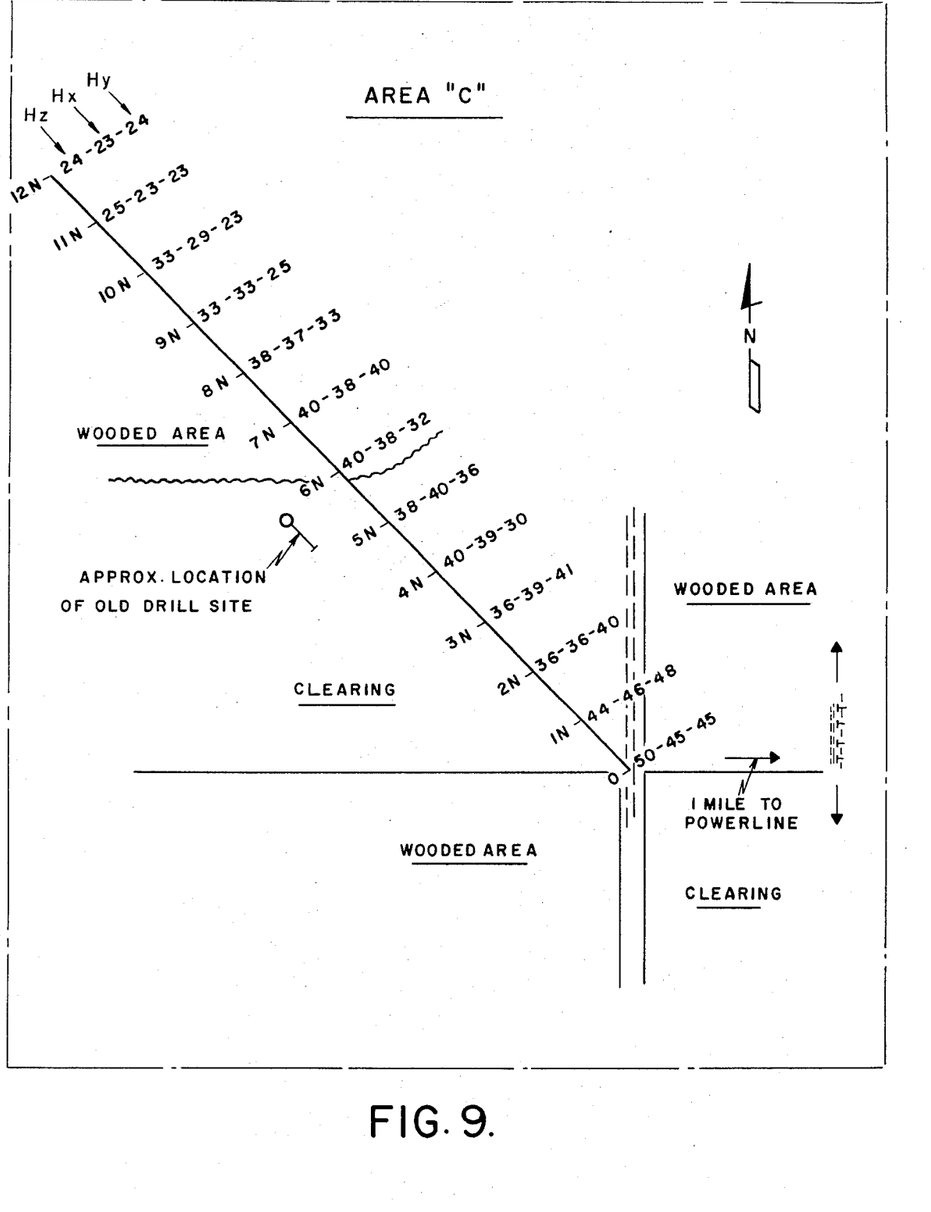
FIG. 9 shows a plan view of still another area in which test surveys were conducted to locate massive sulfide bodies.
Figure 10:
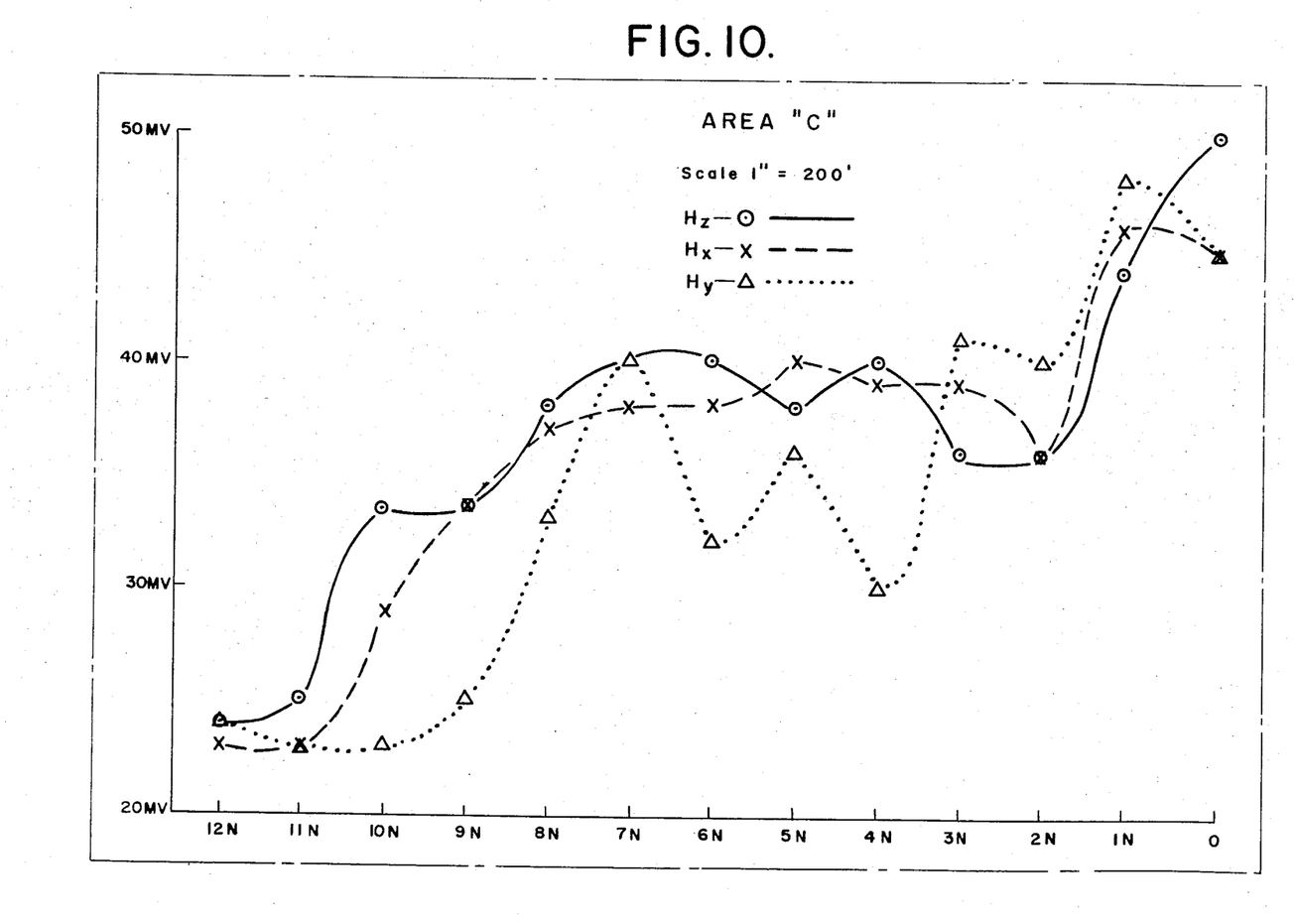
FIG. 10 shows the results plotted in profile view of the data from the tests conducted in the area illustrated in FIG. 9.

An additional test survey of the method of the invention was conducted in area C, a plan view of which is shown in FIG. 9. FIG. 10 shows the results of the test survey in area C. The measurement stations are run at an angle to the conductor body which causes wide variations in the relative amplitudes of the X, Y and Z measurements. One conductor is noted near the road intersection at station 1N and another conductor is noted near 7N. These conductors coincide with the known locations of massive sulfide bodies. Further investigation of the stations located at 7N, 3N and 1N are indicated by the curves of FIG. 10. At each of these points readings might be taken as the detector is rotated in a 360° traverse. The directions of highest resolutions would then be used as the bases for new surveys using new coordinate systems. The values measured in these tests range between 20 and 50 mvs. with the nearest power line again one mile away. The type of geology in area C where the background resistivity is up to 1,000 ohm-meters is a better conductor than the surrounding geology in area B where the background resistivity is between 1,000 and 10,000 ohm-meters. The one mv. sensitivity is satisfactory in the geology of area C.

Although the method of the invention is primarily directed toward locating subterranean conductive mineral bodies, it has applicability in locating any underground conductor body such as a pipe line.

Changes and modifications may be made in the specific illustrative embodiments of the invention shown and/or described herein without departing from the scope of the invention as defined in the appended claims.

Having fully described the apparatus, method of operation, objects and advantages of my invention I claim:

1. A method for exploring for a subterranean electrically conductive massive sulfide body in which induced electromagnetic energy is measured comprising the steps of:

measuring induced electromagnetic energy at selected horizontally spaced apart, aligned station locations only at the frequency, or harmonic thereof, of electrical power current being transmitted over an electrical power line capable of inducing a measurable electromagnetic field in said conductive body, said measurements being made in three coordinate directions X and Y and Z, each coordinate direction being perpendicular to the other, said X and Y and Z directions being, respectively, transverse and parallel and vertical to said conductive body; and plotting said measurements against the station locations to produce an X curve and a Y curve and a Z curve to provide indications of the locations of said conductive body.

* * * * *